United States Patent
Li

(10) Patent No.: US 12,500,245 B1
(45) Date of Patent: Dec. 16, 2025

(54) LITHIUM ION SECONDARY BATTERY

(71) Applicant: ZHUHAI COSMX BATTERY CO., LTD., Zhuhai (CN)

(72) Inventor: Jiao Li, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

(21) Appl. No.: 19/187,836

(22) Filed: Apr. 23, 2025

(30) Foreign Application Priority Data

Dec. 31, 2024 (CN) .......................... 202411994896.X

(51) Int. Cl.
*H01M 4/70* (2006.01)
*H01M 4/66* (2006.01)
*H01M 10/0525* (2010.01)
*H01M 10/0567* (2010.01)
*H01M 4/02* (2006.01)

(52) U.S. Cl.
CPC ............. *H01M 4/70* (2013.01); *H01M 4/661* (2013.01); *H01M 10/0525* (2013.01); *H01M 10/0567* (2013.01); *H01M 2004/021* (2013.01); *H01M 2004/027* (2013.01)

(58) Field of Classification Search
None
See application file for complete search history.

(56) References Cited

FOREIGN PATENT DOCUMENTS

| | | |
|---|---|---|
| CN | 112750978 A | 5/2021 |
| CN | 118435396 A | 8/2024 |
| CN | 118630134 A | 9/2024 |
| CN | 119181856 A | 12/2024 |

OTHER PUBLICATIONS

The First Office Action dated Oct. 31, 2025 for Chinese Application No. 202411994896.X.

*Primary Examiner* — Carlos Barcena

(57) ABSTRACT

A lithium ion secondary battery includes a negative electrode plate and an electrolyte, the negative electrode plate including a negative electrode current collector and a negative electrode active layer, where a content of a chromium element in the negative electrode current collector is in a range of 10-300 ppm, and a groove is provided in a surface of the negative electrode active layer away from the negative electrode current collector, the groove having a depth of H µm; and the electrolyte includes 1,4-dicyano-2-butene with a content of 0.01-5%, and $0.0005 \leq E*H \leq 1.75$ is satisfied. By controlling the content of the chromium element in the negative electrode current collector in the above-mentioned range, it is possible to ensure that the current collector has good conductivity and corrosion resistance.

20 Claims, 3 Drawing Sheets

LITHIUM ION SECONDARY BATTERY

CROSS-REFERENCE TO RELATED APPLICATIONS

This application claims priority to Chinese Patent Application No. 202411994896.X, filed on Dec. 31, 2024, which is hereby incorporated by reference in its entirety.

TECHNICAL FIELD

The present application relates to the technical field of lithium ion batteries, and in particular to a lithium ion secondary battery.

BACKGROUND

In lithium ion secondary batteries, in order to increase energy density of the lithium ion secondary batteries, one of the methods commonly used in the industry is to increase capacity per gram of negative electrode active materials, and silicon materials are commonly used as the negative electrode active materials thanks to their high theoretical capacity per gram. However, silicon particles are prone to volume expansion during lithium ion charging and discharging, resulting in damages of an internal structure of a negative electrode material, which severely affects the service life and stability of a battery. Currently, the stability of a negative electrode plate can be improved by adding 1,4-dicyano-2-butene to an electrolyte, and the presence of the 1,4-dicyano-2-butene can also improve the high-temperature cycling and storage performances of the battery. However, the 1,4-dicyano-2-butene will have a certain corrosive effect on a negative electrode current collector, which not only reduces the conductivity of the current collector, increases the overall internal resistance of the battery, and affects the rate performance of the battery, but also leads to a degradation in mechanical properties, or even breakage, of a copper foil, thus affecting the performance of the battery.

SUMMARY

In view of this, the present application provides a lithium ion secondary battery which is intended to solve the problem of inability of existing lithium ion secondary batteries to mitigate corrosion of a negative electrode current collector while improving high-temperature cycling and rate performances to a certain extent.

According to an embodiment of the present application, there is provided a lithium ion secondary battery, including a negative electrode plate, a positive electrode plate, a separator, and an electrolyte.

The negative electrode plate includes a negative electrode current collector and a negative electrode active layer disposed on at least one side surface of the negative electrode current collector. The negative electrode current collector includes a chromium element, and with a mass of the negative electrode current collector as a reference, a content of the chromium element is Cppm, where $10 \leq C \leq 300$. A groove is provided in a surface of the negative electrode active layer away from the negative electrode current collector, and has a depth of H μm.

The electrolyte includes 1,4-dicyano-2-butene, and with a mass of the electrolyte as a reference, a content of the 1,4-dicyano-2-butene is E, where $0.01\% \leq E \leq 5\%$. The following is satisfied: $0.0005 \leq E*H \leq 1.75$.

In some embodiments, $0.005 \leq E*H \leq 1.5$.

In some embodiments, $5 \leq H \leq 35$.

In some embodiments, $200 \leq C/E \leq 3 \times 10^6$ is satisfied.

In some embodiments, at least one of the following conditions is satisfied:

a, $10 \leq C \leq 100$;
b, $0.1\% \leq E \leq 4.3\%$; and
c, $233 \leq C/E \leq 10^5$.

In some embodiments, a recessed area which has an opening facing the separator is provided in the negative electrode plate, the recessed area including a tab groove and a tab tape groove; where in a thickness direction of the negative electrode plate, the tab tape groove is higher than the tab groove to form a stepped surface, and a tab tape is arranged on the stepped surface and covers the tab groove; in the thickness direction of the negative electrode plate, a thickness $T_3$ of the negative electrode active layer is greater than or equal to a depth $T_1$ of the tab tape groove, and the depth $T_1$ of the tab tape groove is greater than or equal to a thickness $T_2$ of the tab tape; and/or in a length direction of the negative electrode plate, a width $W_1$ of the tab tape groove is greater than or equal to a width $W_2$ of the tab tape, and the width $W_2$ of the tab tape is greater than or equal to a width S of the tab groove.

In some embodiments, a length direction of the groove is parallel to the width direction of the negative electrode plate, at least two grooves are provided, and a spacing between adjacent two of the grooves is L, where $0.5 \text{ mm} \leq L \leq 2 \text{ mm}$; and the width S of the tab groove satisfies: $6 \text{ mm} \leq S \leq 15 \text{ mm}$, and $3 \leq S/L \leq 30$.

In some embodiments, a distance between a junction between the tab groove and the negative electrode active layer and the groove is G1, where $0 \leq G1 \leq 5$ mm.

In some embodiments, a distance between an end of the groove and an edge of the negative electrode active layer is G2, where $0 \leq G2 \leq 5$ mm.

In some embodiments, the negative electrode active layer includes a first active layer and a second active layer arranged in a stack, where the first active layer is located between the negative electrode current collector and the second active layer, and a ratio of a thickness of the second active layer to a total thickness of the negative electrode active layer is x, where $0.1 \leq x \leq 0.5$;

the first active layer includes a first negative electrode active material, the first negative electrode active material including a first graphite having a median particle size $Dv50_1$ in a range of 12 μm-20 μm;

the second active layer includes a second negative electrode active material, the second negative electrode active material including a second graphite having a median particle size $Dv50_2$ in a range of 5 μm-12 μm; and the following is satisfied: $Dv50_1 > Dv50_2$.

In some embodiments, the first negative electrode active material and/or the second negative electrode active material further includes a silicon-based material, and with a mass of the first negative electrode active material or the second negative electrode active material as a reference, a content of the silicon-based material is D, and the following is satisfied: $0.2 \leq D/E \leq 3000$, and $0.01\% \leq E \leq 5\%$.

In some embodiments, D is in a range of 1%-30%.

In some embodiments, D is in a range of 3%-30%, E is in a range of 0.1%-4.3%, and $0.7 \leq D/E \leq 300$.

In some embodiments, the lithium ion secondary battery has a charge cutoff voltage greater than or equal to 4.48 V.

The technical solution of the present application has the following advantages.

The lithium ion secondary battery provided in the present application includes a negative electrode plate, a positive electrode plate, a separator, and an electrolyte, where the negative electrode plate includes a negative electrode current collector and a negative electrode active layer disposed on at least one side surface of the negative electrode current collector. The negative electrode current collector includes a chromium element, and with a mass of the negative electrode current collector as a reference, a content of the chromium element is Cppm, where $10 \leq C \leq 300$. A groove is provided in a surface of the negative electrode active layer away from the negative electrode current collector, and has a depth of H µm. The electrolyte includes 1,4-dicyano-2-butene, and with a mass of the electrolyte as a reference, a content of the 1,4-dicyano-2-butene is E, where $0.01\% \leq E \leq 5\%$. The following is satisfied: $0.0005 \leq E*H \leq 1.75$. The present application has found through studies that when the content of the chromium element in the negative electrode current collector is in the range from 10 to 300 ppm, it is possible to ensure that the negative electrode current collector has good conductivity and corrosion resistance. On this basis, by adjusting the depth H of the groove in the negative electrode plate and the content E of the electrolyte additive 1,4-dicyano-2-butene to satisfy that E*H is in the range from 0.0005 to 1.75, it is possible to, on the one hand, decrease a rate of oxidative corrosion of the negative electrode current collector to increase the tensile strength of the negative electrode current collector so as to prevent breakage of the negative electrode current collector, and to, on the other hand, ensure that the battery has relatively high rate and high-temperature cycling performances.

Additional aspects and advantages of the embodiments of the present application will be described and shown in part in the following descriptions, or will be explained by means of the implementation of the embodiments of the present application.

BRIEF DESCRIPTION OF THE DRAWINGS

In order to illustrate the technical solutions in the particular embodiments of the present application or in the prior art more clearly, the accompanying drawings to be used in the description of the particular embodiments or the prior art will be briefly introduced below; obviously, the accompanying drawings in the following description show some of the embodiments of the present application, and those of ordinary skill in the art may still obtain other drawings from these accompanying drawings without creative effort.

LIST OF REFERENCE SIGNS

Figure 1:
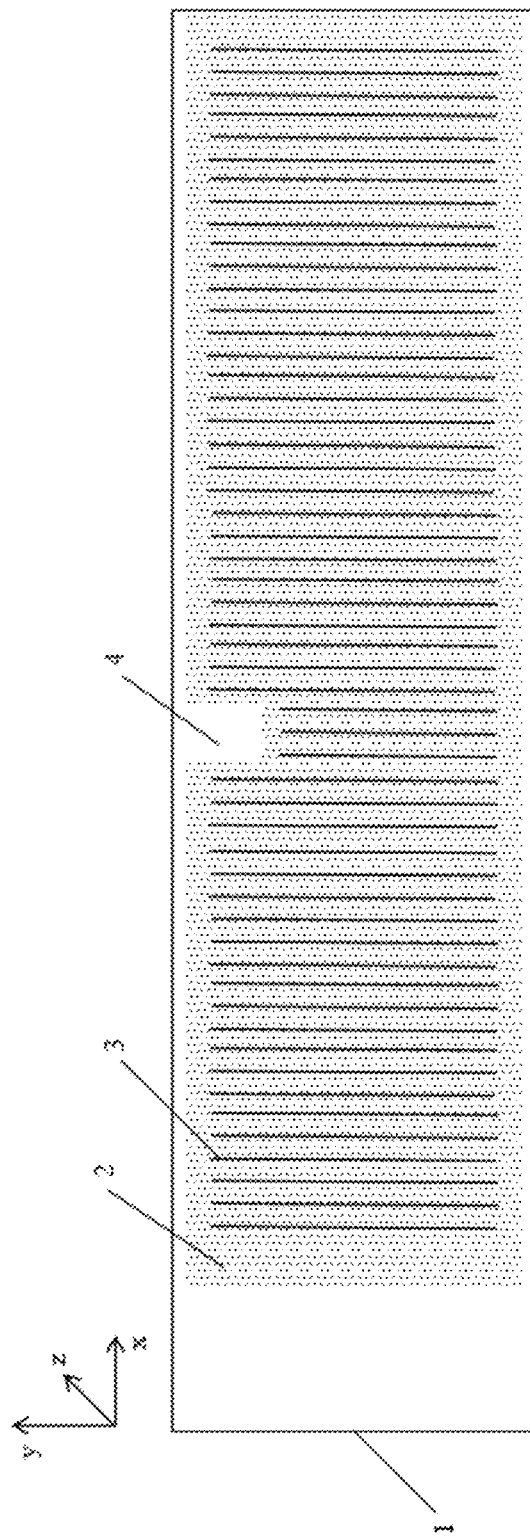
FIG. 1 is a structural schematic diagram of a negative electrode plate according to an embodiment of the present application.

1. Negative electrode current collector; 2. Negative electrode active layer; 3. Groove; 4. Tab groove; 5. Tab; 6. Tab tape groove; 7. Stepped surface.

DETAILED DESCRIPTION OF EMBODIMENTS

The following examples are provided for a better understanding of the present application, are not limited to the embodiments, and do not limit the content and scope of protection of the present application, and any product that is identical or similar to the present application, derived from the inspiration of the present application or by combining the present application with other features of the prior art, falls within the scope of protection of the present application.

In the description of the present application, it should be noted that the orientation or positional relationships indicated by terms such as "inner" and "outer" are based on the orientation or positional relationships shown in the accompanying drawings and are merely for ease of description of the present application and simplification of the description, rather than indicating or implying that the devices or elements referred to must have a specific orientation or be constructed and operated in a described orientation, and therefore cannot be construed as limiting the present application. Moreover, the terms "first" and "second" are merely used for the descriptive purpose, and should not be construed as indicating or implying the relative importance.

The examples in which experimental steps or conditions are not specified are based on the operations of conventional experimental steps or conditions described in documents in the art. The reagents or instruments used without indicating a manufacturer are all commercially available conventional reagent products.

In addition, the technical features referred to in different embodiments of the present application described below can be combined with each other as long as they do not conflict with each other.

It should first be noted that, at a high potential, a 1,4-dicyano-2-butene additive in an electrolyte can participate in the formation of an SEI on a surface of a negative electrode, stabilizing an electrode-electrolyte interface and effectively improving the high-temperature cycling and high-temperature storage performance of a battery. Unfortunately, the present application has found through studies that the process of 1,4-dicyano-2-butene participating in the construction of the SEI will cause oxidative corrosion to a negative electrode current collector, resulting in a degradation in the mechanical properties, or even breakage, of the negative electrode current collector.

In order to improve the corrosion resistance of the negative electrode current collector, a typical practice is to plate chromium on a surface of the negative electrode current collector to form a passivation layer, and a higher content of the chromium on the negative electrode current collector results in a better corrosion resistance, but also affects the conductivity of the negative electrode current collector.

By using laser to scribe a line (or referred to as a groove) having a certain depth and width on a surface of a negative electrode plate, an area of contact between the negative electrode plate and the electrolyte can be increased, which facilitates infiltration of the electrolyte and causes a more complete electrochemical reaction, thereby improving the capacity and energy density of the battery, and which also shortens the distance of migration of lithium ions in the negative electrode plate, thereby increasing the charging and discharging rate of the battery.

The present application has found through studies that during laser scribing, the energy emitted by the laser is absorbed not only by a negative electrode active layer but also by the negative electrode current collector, causing the passivation layer on the surface of the negative electrode current collector, such as a copper foil, to be damaged. As the intensity of the laser increases, the depth of the groove increases, the energy of laser absorbed by the negative electrode current collector also increases, accordingly, the degree of damage of the passivation layer increases, and the copper foil is even affected. The damaged negative electrode current collector is oxidized when undergoing a charge and discharge process, which reduces the conductivity of the negative electrode current collector, causing an increase in the overall internal resistance of the battery, and which also reduces the thickness of the negative electrode current collector, affecting its tensile strength.

In order to solve the above problems of the related art, the present application provides a lithium ion secondary battery, including a negative electrode plate, a positive electrode plate, a separator, and an electrolyte.

The negative electrode plate includes a negative electrode current collector and a negative electrode active layer disposed on at least one side surface of the negative electrode current collector.

The negative electrode current collector includes a chromium element, and with a mass of the negative electrode current collector as a reference, a content of the chromium element is Cppm, where $10 \leq C \leq 300$.

A groove is provided in a surface of the negative electrode active layer away from the negative electrode current collector, and has a depth of H μm.

The electrolyte includes 1,4-dicyano-2-butene, and with a mass of the electrolyte as a reference, a content of the 1,4-dicyano-2-butene is E, where $0.01\% \leq E \leq 5\%$. The following is satisfied: $0.0005 \leq E*H \leq 1.75$.

The present application has found through studies that when the content of the chromium element in the negative electrode current collector is in the range from 10 to 300 ppm, it is possible to ensure that the negative electrode current collector has good conductivity and corrosion resistance. On this basis, by adjusting the depth H of the groove in the negative electrode plate and the content E of the electrolyte additive 1,4-dicyano-2-butene to satisfy that E*H is in the range from 0.0005 to 1.75, it is possible to, on the one hand, decrease a rate of oxidative corrosion of the negative electrode current collector to increase the tensile strength of the negative electrode current collector so as to prevent breakage of the negative electrode current collector, and to, on the other hand, ensure that the battery has relatively high rate and high-temperature cycling performances.

If the content of the 1,4-dicyano-2-butene in the electrolyte is too high, the corrosion effect on the negative electrode current collector is greater, and in this case, the groove in the negative electrode plate needs to be controlled to be shallower, that is, the value of H needs to be decreased. In contrast, if the content of the 1,4-dicyano-2-butene in the electrolyte is too low, the corrosion effect on the negative electrode current collector is less, although it is not conducive to improving the high-temperature cycling performance of the battery, and in this case, the groove in the negative electrode plate can be deeper, that is, the value of H needs to be increased, thereby facilitating infiltration of the electrolyte and improving the rate performance of the battery. It can be understood that the content of the 1,4-dicyano-2-butene in the electrolyte and the depth of the groove in the negative electrode plate cannot both be too large, otherwise the corrosion of the negative electrode current collector will be accelerated, affecting the performance of the battery. That is, the depth H of the groove in the negative electrode plate is negatively related to the content E of the electrolyte additive 1,4-dicyano-2-butene, and the value of E*H needs to be controlled in the range of 0.0005-1.75 in order to take both the tensile strength of the negative electrode current collector and the high-temperature cycling and rate performances of the battery into account.

A s an example, the content C of the chromium element in the negative electrode current collector may be, for example, 10 ppm, 50 ppm, 100 ppm, 150 ppm, 200 ppm, 250 ppm, 300 ppm, etc. or in a range of any two of the above values. The content E of the 1,4-dicyano-2-butene in the electrolyte may be 0.01%, 0.1%, 0.25%, 0.5%, 0.75%, 1%, 2.5%, 4.3%, 5%, etc. or in a range of any two of the above values. The value of E*H may be 0.0005, 0.005, 0.05, 0.1, 0.5, 1, 1.5, 1.75, etc. or in a range of any two of the above values.

Further studies have shown that when the product E*H of the depth H of the groove in the negative electrode plate and the content E of the 1,4-dicyano-2-butene in the electrolyte is in the range of 0.005-1.5, it is possible to more effectively decrease the rate of oxidative corrosion of the negative electrode current collector and prevent the breakage of the negative electrode current collector, and to ensure the rate and high-temperature cycling performances of the battery. In particular, the content E of the 1,4-dicyano-2-butene in the electrolyte being in the range of 0.1%-4.3% can improve the stability of lattice of a positive electrode material and may not cause excessive corrosion to the negative electrode current collector, which facilitates maintaining the strength of the negative electrode current collector, thereby ensuring the performance of the battery.

In some embodiments, the depth H of the groove in the negative electrode plate is in a range of 5 μm-35 μm, for example, may be 5 μm, 10 μm, 15 μm, 20 μm, 25 μm, 30 μm, 35 μm, etc. or in a range of any two of the above values. Thus, the infiltration effect of the electrolyte on the negative electrode plate can be ensured, the polarization on a negative electrode side can be reduced, the internal resistance of the battery can be reduced, and the rate performance can be ensured. In addition, the negative electrode current collector will not be damaged excessively, which facilitates maintaining a relatively high tensile strength of the negative electrode current collector, thereby ensuring the performance of the battery.

The present application has found through studies that when a ratio C/E of the content C of the chromium element in the negative electrode current collector to the content E of the 1,4-dicyano-2-butene in the electrolyte falls within the range of $200-3 \times 10^6$, the conductivity of the negative electrode current collector can be ensured, and the electrolyte can also be prevented from corroding the negative electrode current collector, thereby ensuring the rate and high-temperature cycling performances of the battery.

If the content of the chromium element in the negative electrode current collector is relatively high, it means that the negative electrode current collector has good corrosion resistance, and in this case, the content of the 1,4-dicyano-2-butene additive in the electrolyte can be appropriately increased to improve the stability of the negative electrode plate and the high-temperature cycling performance of the battery. In contrast, if the content of the chromium element in the negative electrode current collector is relatively low, it means that the negative electrode current collector has poor corrosion resistance, and in this case, the content of the 1,4-dicyano-2-butene additive in the electrolyte should be appropriately reduced to ensure that the negative electrode current collector can meet the requirements for strength, thereby ensuring the performance of the battery.

As an example, the value of C/E may be 200, 233, 600, 1000, 5000, 10000, 50000, 100000, 500000, 1000000, 3000000, etc. or in a range of any two of the above values.

In particular, C/E falling within the range of 233-105 can more effectively ensure that the negative electrode current collector has a relatively high tensile strength, and the battery has good rate and high-temperature cycling performances.

Figure 2:
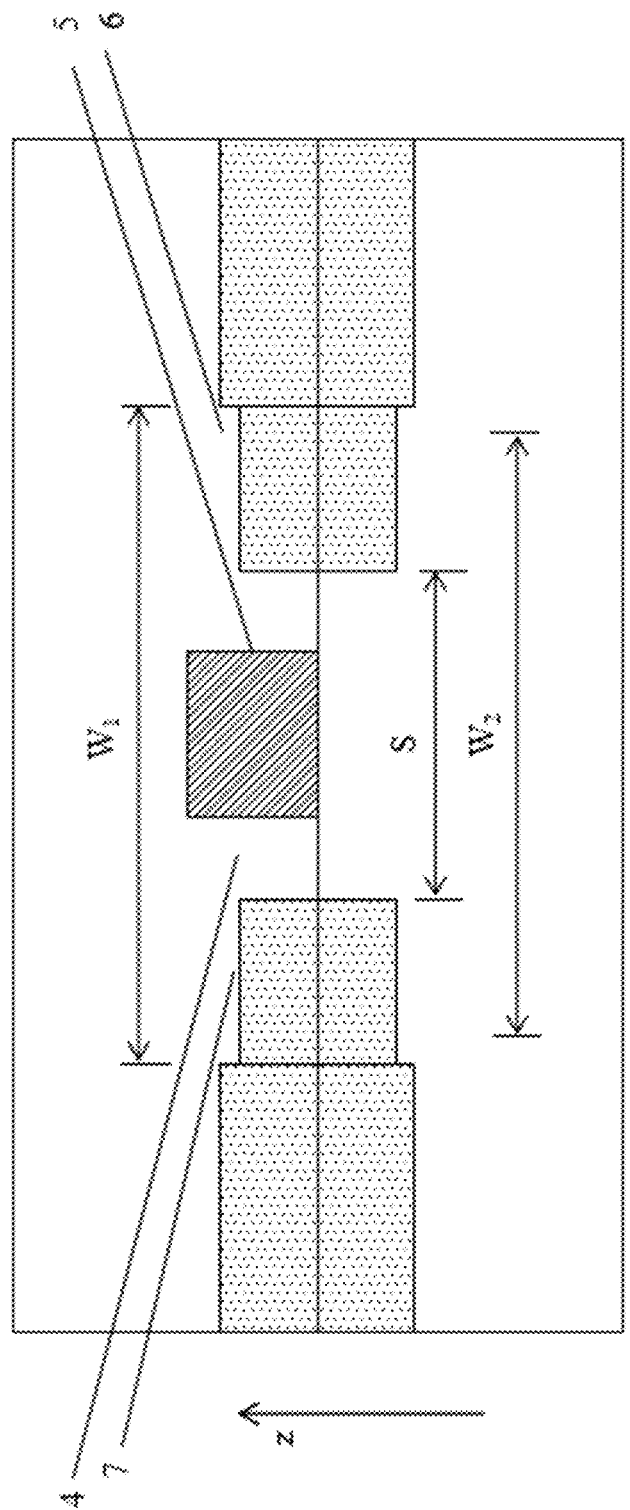
FIG. 2 is a partial schematic cross-sectional view of a negative electrode plate according to an embodiment of the present application.

In a wound lithium ion secondary battery, a roll core is formed by winding a positive electrode plate, a negative electrode plate and a separator between the positive electrode plate and the negative electrode plate. In some embodiments, an expanded plane view and a partial cross-sectional view of the negative electrode plate are shown in FIG. 1 and FIG. 2, respectively. Referring to FIGS. 1 and 2, a recessed area which has an opening facing the separator is provided in the middle of the negative electrode plate. The recessed area includes a tab groove 4 and a tab tape groove 6. In a thickness direction of the negative electrode plate (z direction), the tab tape groove 6 is higher than the tab groove 4 to form a stepped surface 7, and a tab tape (not shown) is arranged on the stepped surface 7 and covers the tab groove 4. In the thickness direction of the negative electrode plate, a thickness $T_3$ of the negative electrode active layer is greater than or equal to a depth $T_1$ of the tab tape groove, and the depth $T_1$ of the tab tape groove is greater than or equal to a thickness $T_2$ of the tab tape.

It can be understood that since the tab 5 is welded in the tab groove 4, a welding point protrusion is formed at a position where the tab is welded, and in order to prevent the tab protrusion from piercing the separator and causing a short circuit, a typical practice is to stick a tab tape at the opening of the tab groove so as to isolate the welding point protrusion from the separator. However, the thickness of the tab tape itself causes the electrode plate to protrude, forming a bridge with the separator after winding, which leads to a long conduction interface path for lithium ions here and an increased impedance, and is also likely to cause interface defects such as bubbles and pores, resulting in lithium precipitation during the charging of the battery. Therefore, the present application employs a step embedding technique, a tab tape is embedded in the negative electrode active layer to counteract the sacrifice of a thickness of a battery cell due to the thickness of the tape, achieving the purpose of increasing the energy density of the battery cell.

Further, in some embodiments, in a length direction (x direction) of the negative electrode plate, a width $W_1$ of the tab tape groove is greater than or equal to a width $W_2$ of the tab tape, and the width $W_2$ of the tab tape is greater than or equal to a width S of the tab groove. Thus, the flatness of the tab tape can be ensured, such that the tab tape can cover the entirety of an exposed copper foil in the tab groove, so as to prevent oxidative corrosion of the copper foil current collector by the electrolyte.

Figure 3:
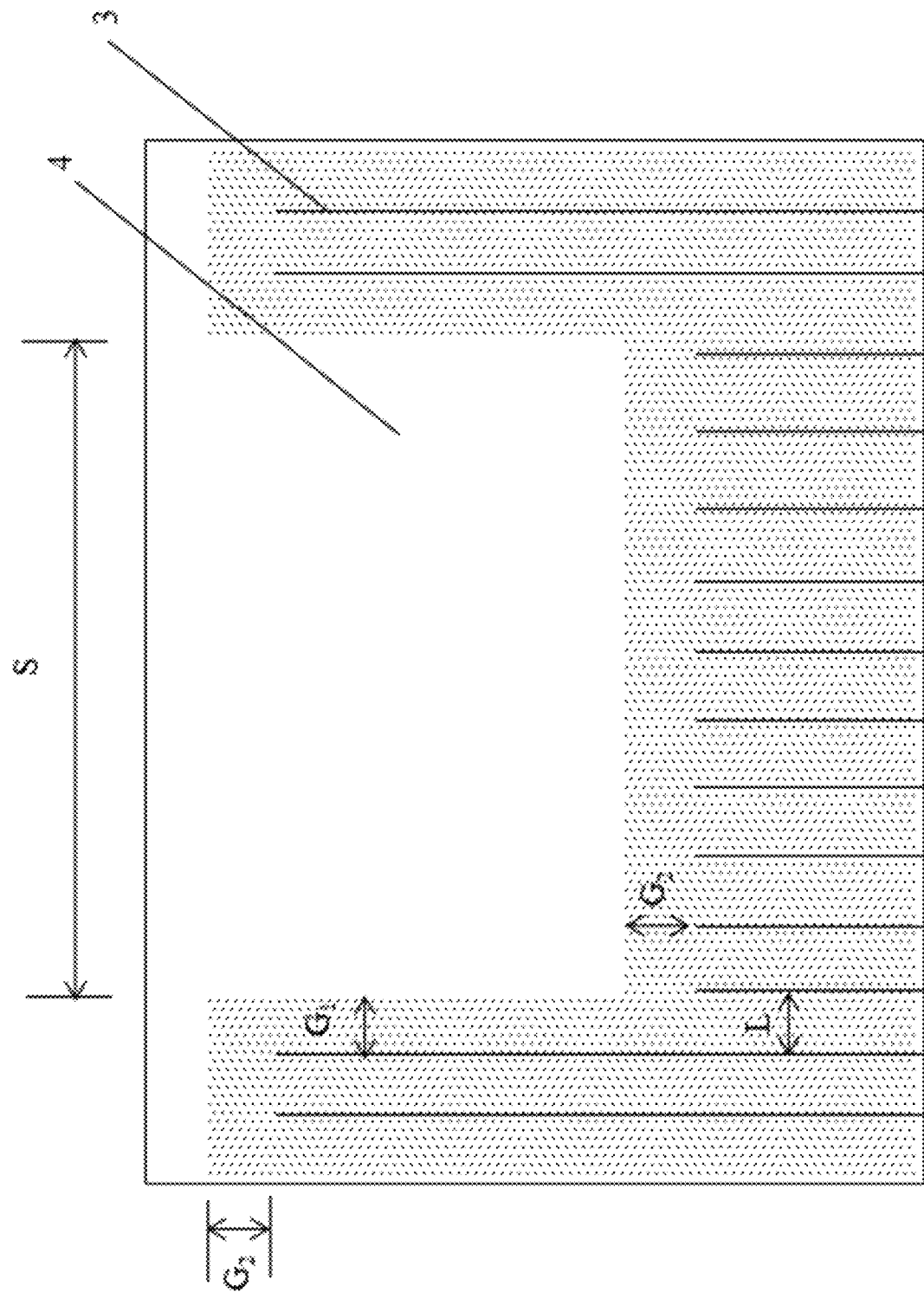
FIG. 3 is a partial enlarged view of FIG. 1.

In order to prevent a reduced strength of the exposed copper foil current collector in the tab groove after absorbing heat caused by a relatively large range of laser thermal radiation during laser scribing, in some embodiments of the present application, referring to FIG. 3, it is necessary to ensure that a distance $G_1$ between the groove and an edge of the tab groove (i.e., a junction between the tab groove and the negative electrode active layer) is greater than 0 and less than or equal to 5 mm, and may be, for example, 0.1 mm, 0.5 mm, 1 mm, 2 mm, 3 mm, 4 mm, 5 mm, etc. or in a range of any two of the above values.

It can be understood that a width of the negative electrode active layer is less than a width of the negative electrode current collector, thereby forming a bare foil area (i.e., the exposed copper foil current collector) in a width direction of the negative electrode current collector (y direction). In order to prevent a reduced strength of the exposed copper foil current collector in the bare foil area after absorbing heat caused by a relatively large range of laser thermal radiation during laser scribing, in some embodiments of the present application, it is necessary to ensure that a length of the groove is less than the width of the negative electrode active layer. Referring to FIG. 3, for example, a distance $G_2$ between each of two ends of the groove (a distance between the two ends being the length of the groove) and an edge of the negative electrode active layer adjacent to the end is greater than 0 and less than or equal to 5 mm, and may be, for example, 0.1 mm, 0.5 mm, 1 mm, 2 mm, 3 mm, 4 mm, 5 mm, etc. or in a range of any two of the above values.

In some embodiments, referring to FIGS. 1 and 3, the groove in the negative electrode plate may be linear or curved, and for ease of processing, a linear groove is often used. One, two, three or more grooves may be provided, and in order to take the performance of the battery into account, it is usually necessary to provide a plurality of grooves, which may be arranged at uniform intervals or irregular intervals. In view of the ease of processing, in the present application, a plurality of grooves are arranged at uniform intervals, with a spacing between adjacent two of the grooves being L, where 0.5 mm≤L≤2 mm. As an example, the spacing L between the grooves may be 0.5 mm, 1 mm, 1.5 mm, 2 mm, etc. or in a range of any two of the above values. In this case, each of the grooves may be distributed in the width direction of the negative electrode plate.

The present application has found through studies that the width S of the tab groove (in the length direction of the negative electrode plate) and the spacing L between the grooves satisfying 3≤S/L≤30 can reduce the influences of laser radiation on the exposed copper foil in the tab groove, thereby preventing insufficient tab welding or damage to the negative electrode current collector after welding. In some embodiments, the width S of the tab groove is in a range of 6 mm-15 mm, and may be, for example, 6 mm, 8 mm, 10 mm, 12 mm, 15 mm, etc. or in a range of any two of the above values. A ratio S/L of the width of the tab groove to the spacing between the grooves may be 3, 5, 8, 10, 13, 15, 18, 20, 23, 25, 28, 30, etc. or in a range of any two of the above values.

In order to optimize the performance of the battery, a double-layer coating technique may be used for a negative electrode slurry. Therefore, in some embodiments of the present application, the negative electrode active layer includes a first active layer and a second active layer arranged in a stack, the first active layer being located between the negative electrode current collector and the second active layer.

The first active layer includes a first negative electrode active material including a first graphite. A median particle size $Dv50_1$ of the first graphite is in a range of 12 μm-20 μm, for example, may be 12 μm, 14 μm, 16 μm, 18 μm, 20 μm, etc. or in a range of any two of the above values. The second active layer includes a second negative electrode active material including a second graphite. A median particle size $Dv50_2$ of the second graphite is in a range of 5 μm-12 μm, for example, may be 5 μm, 7 μm, 9 μm, 10 μm, 11 μm, 12 μm, etc. or in a range of any two of the above values, and the median particle size $Dv50_1$ of the first graphite is larger than the median particle size $Dv50_2$ of the second graphite.

It should be noted that both the median particle size $Dv50_1$ of the first graphite and the median particle size $Dv50_2$ of the second graphite can be measured by a laser particle size analyzer.

The present application has found through studies that the second active layer on a surface of the negative electrode plate includes small-particle graphite to facilitate the infiltration of the electrolyte and intercalation and de-intercalation of lithium ions, which increases the charging and discharging rate of the battery, but also increases the risk of corrosion of the negative electrode current collector. Therefore, in the present application, a ratio x of a thickness of the second active layer to a total thickness of the negative electrode active layer is controlled to satisfy $0.1 \leq x \leq 0.5$ in order to take into account both the rate performance of the battery and the tensile strength of the copper foil, and the first active layer including large-particle graphite is provided under the second active layer, the large-particle graphite having an improved structural stability than the small-particle graphite, which facilitates the cycling performance of the battery, and by means of particle size gradation of the large/small-particle graphite, compaction density of the negative electrode plate can be improved, further alleviating the problem of the negative electrode current collector being prone to corrosion, thereby ensuring the performance of the battery.

As an example, the value of the ratio x of the thickness of the second active layer to the total thickness of the negative electrode active layer may be, for example, 0.1, 0.2, 0.3, 0.4, 0.5, etc. or in a range of any two of the above values.

Further, When the ratio x of the thickness of the second active layer to the total thickness of the negative electrode active layer, the content E of the 1,4-dicyano-2-butene additive in the electrolyte, and the median particle size $Dv50_1$ of the first graphite and the median particle size $Dv50_2$ of the second graphite satisfy: $200 \leq (x*Dv50_2+(1-x)*Dv50_1)/E \leq 190000$, it is possible to ensure the tensile strength of the copper foil while taking into account the rate and cycling performance of the battery, thereby ensuring the performance of the battery.

As an example, a value of $(x*Dv50_2+(1-x)*Dv50_1)/E$ may be 200, 1,000, 5,000, 10,000, 25,000, 50,000, 75,000, 100,000, 150,000, 190,000, etc. or in a range of any two of the above values.

It can be understood that the silicon negative electrode has the advantage of high capacity per gram and high energy density, and can significantly increase the energy density of the battery cell when applied to the lithium ion secondary battery of the present application. Specifically, in some embodiments of the present application, the first negative electrode active material and/or the second negative electrode active material further includes a silicon-based material. With the mass of the first negative electrode active material or the second negative electrode active material as a reference, the content of the silicon-based material is D, $1\% \leq D \leq 30\%$. As an example, the amount of the doped silicon-based material may be, for example, 1%, 3%, 7%, 10%, 15%, 20%, 25%, 30% or in a range of any two of the above values.

The present application has found through studies that when the content D of the silicon-based material and the content E of the 1,4-dicyano-2-butene additive in the electrolyte satisfy $0.2 \leq D/E \leq 3000$, particularly $0.7 \leq D/E \leq 300$, the stability of the negative electrode material can be further ensured while preventing the corrosion of the copper foil, thereby facilitating the improvement of the cycling and safety performance of the battery. A s an example, the value of D/E may be 0.2, 0.7, 2, 10, 50, 100, 200, 300, 500, 1,000, 3,000, etc. or in a range of any two of these values.

It should be noted that a charge cutoff voltage of the lithium ion secondary battery of the present application is greater than or equal to 4.48 V, which is higher than an upper limit charge voltage of a conventional lithium ion secondary battery, so that the lithium ion secondary battery of the present application has advantages in terms of energy density, usage time and dynamic performance.

The present application will be further described in detail below with reference to specific examples, which cannot be construed as limiting the scope of protection of the present application. The examples and comparative examples in which experimental steps or conditions are not specified are based on the operations of conventional experimental steps or conditions described in documents in the art. The reagents or instruments used without indicating a manufacturer are all commercially available conventional reagent products. In all examples and comparative examples of the present application, the unit % represents content percentage by mass.

Example 1

First Step: Preparation of Positive Electrode Plate

Lithium cobaltate, conductive carbon black (SP) and polyvinylidene fluoride (PVDF) are mixed at a mass ratio of 97.6:1.4:1, and the mixture is added to N-methylpyrrolidone (N M P) and stirred until uniform to prepare a positive electrode slurry.

The positive electrode slurry are coated on front and back surfaces of an aluminum foil, and after baking and rolling, a positive electrode plate having a thickness of 80 μm is obtained. The positive electrode plate has one groove with a fixed size, and an aluminum tab is welded in this groove by means of laser to obtain a positive electrode plate containing the aluminum tab.

Second Step: Preparation of a Negative Electrode Plate

A first negative electrode active substance, SP, lithium carboxymethyl cellulose (CMC-Li) and styrene-butadiene rubber (SB R) are mixed at a mass ratio of 97:0.4:0.1:2.5, and the mixture is added to deionized water to prepare a first negative electrode slurry. The first negative electrode active substance is silicon carbon-doped graphite, the particle size $Dv50_1$ of the graphite is 13 μm, the weight of the silicon carbon accounts for 5% of the total weight of the first negative electrode active material, and the silicon content of the silicon carbon particles is 50%.

A second negative electrode active substance, SP, CMC-Li and Polyacrylic acid (PAA) are mixed at a mass ratio of 97:0.4:0.1:2.5, and the mixture is added to deionized water to prepare a second negative electrode slurry. The second negative electrode active substance is silicon-carbon doped graphite, the particle size $Dv50_2$ of the graphite is 8 μm, the weight of silicon carbon accounts for 5% of the total weight of the second negative electrode active material, and the silicon content of the silicon carbon particles is 50%.

The first negative electrode slurry is coated on two surfaces of a chromium plated copper foil, and the content of Cr in the copper foil is 100 ppm, then the second negative electrode slurry is coated on a surface of the first negative electrode slurry, and after baking and rolling, a negative electrode plate having a thickness of 95 μm is obtained. The negative electrode plate has a tab groove with a width of S=9 mm and a depth equal to the thickness $T_3$=45 μm of a single-sided negative electrode active layer, a copper-plated nickel tab having a width of 6 mm is laser welded in this tab groove, a protective tape is bonded on a surface of the tab and has a width of $W_2=12$ mm and a thickness of $T_2=12$ μm, and the protective tape is accommodated in a tab tape groove, a projection of the tab groove on the copper foil being located within a projection of the tab tape groove on the copper foil, the tab tape groove having a depth of $T_1=15$ μm and a width of $W_1=14$ mm.

A plurality of grooves arranged at uniform intervals are formed in a surface of the negative electrode plate by means of laser scribing, the grooves has a spacing of $L=1.2$ mm therebetween and a depth of $H=15$ μm, a distance reserved between an end of the groove and an edge of the tab groove is $G_1=0.5$ mm, and a distance reserved between each of two ends of the groove and an edge of the negative electrode active layer is $G_2=0.5$ mm.

Third step: The positive electrode plate and the negative electrode plate is subjected to slitting and plate-making and is then wound with a separator to obtain a roll core.

Fourth step: The roll core is subjected to packaging, baking, electrolyte filling, forming, secondary packaging, sorting and OCV to obtain a lithium ion battery. The electrolyte is a commercially available conventional electrolyte, a lithium salt in the electrolyte is $LiFP_6$, and the amount of addition of the additive 1,4-dicyano-2-butene is 1%.

The preparation method in Examples 2-6 and Examples 1-1 to 1-26 is substantially the same as in Example 1, and the differences are shown in Tables 1 and 2. E is the content of the 1,4-dicyano-2-butene in the electrolyte, H is the depth of the groove in the negative electrode plate, C is the content of the chromium element in the chrome plated copper foil, L is the spacing between the grooves in the negative electrode plate, S is the width of the tab groove in the negative electrode plate, D is the content of the silicon in the negative electrode active substance, $Dv50_1$ is the median particle size of the graphite in the first active layer, $Dv50_2$ is the median particle size of the graphite in the second active layer, x is the ratio of the thickness of the second active layer to the total thickness of the negative electrode active layer.

TABLE 1

|  | E (%) | H(μm) | E * H | C (ppm) | C/E |
|---|---|---|---|---|---|
| Example 1 | 1 | 15 | 0.15 | 100 | 10000 |
| Example 1-1 | 0.5 | 10 | 0.05 | 100 | 20000 |
| Example 1-2 | 0.1 | 5 | 0.005 | 100 | 100000 |
| Example 1-3 | 0.01 | 5 | 0.0005 | 100 | 1000000 |
| Example 1-4 | 2.5 | 20 | 0.5 | 100 | 4000 |
| Example 1-5 | 4.3 | 35 | 1.505 | 100 | 2326 |
| Example 1-6 | 5 | 35 | 1.75 | 100 | 2000 |
| Example 1-7 | 5 | 25 | 1.25 | 10 | 200 |
| Example 1-8 | 4.3 | 25 | 1.075 | 50 | 1163 |
| Example 1-9 | 4.3 | 25 | 1.075 | 10 | 233 |
| Example 1-10 | 0.1 | 25 | 0.025 | 100 | 100000 |
| Example 1-11 | 0.01 | 25 | 0.0025 | 300 | 3000000 |
| Example 1-12 | 5 | 35 | 1.75 | 10 | 200 |
| Example 1-13 | 0.01 | 5 | 0.0005 | 300 | 3000000 |
| Example 1-14 | 1 | 15 | 0.15 | 100 | 10000 |
| Example 1-15 | 1 | 15 | 0.15 | 100 | 10000 |
| Example 1-16 | 1 | 15 | 0.15 | 100 | 10000 |
| Example 1-17 | 1 | 15 | 0.15 | 100 | 10000 |
| Example 1-18 | 1 | 15 | 0.15 | 100 | 10000 |
| Example 1-19 | 0.1 | 5 | 0.005 | 100 | 100000 |
| Example 1-20 | 0.1 | 5 | 0.005 | 100 | 100000 |
| Example 1-21 | 0.1 | 5 | 0.005 | 100 | 100000 |
| Example 1-22 | 0.01 | 5 | 0.0005 | 100 | 1000000 |
| Example 1-23 | 0.01 | 5 | 0.0005 | 100 | 1000000 |
| Example 1-24 | 0.02 | 15 | 0.15 | 100 | 500000 |
| Example 1-25 | 0.03 | 15 | 0.15 | 100 | 333333 |
| Example 1-26 | 5 | 15 | 0.15 | 100 | 2000 |
| Example 1-27 | 0.01 | 15 | 0.15 | 100 | 1000000 |
| Comparative example 1 | 0.008 | 5 | 0.0004 | 100 | 1250000 |
| Comparative example 2 | 6 | 30 | 1.8 | 100 | 1667 |

TABLE 2

|  | L (mm) | S (mm) | S/L | D (%) | D/E | $Dv50_1$ (μm) | $Dv50_2$ (μm) | x | (x * $Dv50_2$ + (1 − x) * $Dv50_1$)/E |
|---|---|---|---|---|---|---|---|---|---|
| Example 1 | 1.2 | 9 | 7.5 | 5 | 5 | 13 | 8 | 0.3 | 11.5 |
| Example 1-1 | 1.2 | 9 | 7.5 | 5 | 10 | 13 | 8 | 0.3 | 23 |
| Example 1-2 | 1.2 | 9 | 7.5 | 5 | 50 | 13 | 8 | 0.3 | 115 |
| Example 1-3 | 1.2 | 9 | 7.5 | 5 | 500 | 13 | 8 | 0.3 | 1150 |
| Example 1-4 | 1.2 | 9 | 7.5 | 5 | 2 | 13 | 8 | 0.3 | 4.6 |
| Example 1-5 | 1.2 | 9 | 7.5 | 5 | 1.2 | 13 | 8 | 0.3 | 2.7 |
| Example 1-6 | 1.2 | 9 | 7.5 | 5 | 1 | 13 | 8 | 0.3 | 2.3 |
| Example 1-7 | 1.2 | 9 | 7.5 | 5 | 1 | 13 | 8 | 0.3 | 2.3 |
| Example 1-8 | 1.2 | 9 | 7.5 | 5 | 1.2 | 13 | 8 | 0.3 | 2.7 |
| Example 1-9 | 1.2 | 9 | 7.5 | 5 | 1.2 | 13 | 8 | 0.3 | 2.7 |
| Example 1-10 | 1.2 | 9 | 7.5 | 5 | 50 | 13 | 8 | 0.3 | 115 |
| Example 1-11 | 1.2 | 9 | 7.5 | 5 | 500 | 13 | 8 | 0.3 | 1150 |
| Example 1-12 | 1.2 | 9 | 7.5 | 5 | 1 | 13 | 8 | 0.3 | 2.3 |
| Example 1-13 | 1.2 | 9 | 7.5 | 5 | 500 | 13 | 8 | 0.3 | 1150 |
| Example 1-14 | 0.8 | 12 | 15 | 5 | 5 | 13 | 8 | 0.3 | 11.5 |
| Example 1-15 | 0.5 | 15 | 30 | 5 | 5 | 13 | 8 | 0.3 | 11.5 |
| Example 1-16 | 2 | 6 | 3 | 5 | 5 | 13 | 8 | 0.3 | 11.5 |
| Example 1-17 | 2 | 4 | 2 | 5 | 5 | 13 | 8 | 0.3 | 11.5 |
| Example 1-18 | 0.5 | 16 | 32 | 5 | 5 | 13 | 8 | 0.3 | 11.5 |
| Example 1-19 | 1.2 | 9 | 7.5 | 15 | 150 | 13 | 8 | 0.3 | 115 |
| Example 1-20 | 1.2 | 9 | 7.5 | 30 | 300 | 13 | 8 | 0.3 | 115 |
| Example 1-21 | 1.2 | 9 | 7.5 | 3 | 30 | 13 | 8 | 0.3 | 115 |
| Example 1-22 | 1.2 | 9 | 7.5 | 0.002 | 0.2 | 13 | 8 | 0.3 | 1150 |
| Example 1-23 | 1.2 | 9 | 7.5 | 30 | 3000 | 13 | 8 | 0.3 | 1150 |
| Example 1-24 | 1.2 | 9 | 7.5 | 5 | 250 | 13 | 8 | 0.3 | 575 |
| Example 1-25 | 1.2 | 9 | 7.5 | 5 | 166.7 | 13 | 8 | 0.3 | 383.3 |

TABLE 2-continued

| | L (mm) | S (mm) | S/L | D (%) | D/E | $Dv50_1$ (μm) | $Dv50_2$ (μm) | x | $(x * Dv50_2 + (1 - x) * Dv50_1)/E$ |
|---|---|---|---|---|---|---|---|---|---|
| Example 1-26 | 1.2 | 9 | 7.5 | 5 | 1 | 12 | 5 | 0.3 | 1.98 |
| Example 1-27 | 1.2 | 9 | 7.5 | 5 | 500 | 20 | 12 | 0.1 | 1920 |
| Comparative example 1 | 1.2 | 9 | 7.5 | 30 | 3750 | 13 | 8 | 0.3 | 1762.5 |
| Comparative example 2 | 1.2 | 9 | 7.5 | 30 | 5 | 13 | 8 | 0.3 | 2.35 |

Measurement Examples

1. Measurement of Particle Size

After the lithium ion secondary battery is discharged to 0% SOC, the lithium ion secondary battery is disassembled, the negative electrode plate is removed, soaked in a dimethyl carbonate (DMC) solvent for 12 h and then rinsed with DMC to remove lithium salt adhered to the electrode plate, and the negative electrode active layer is rinsed off the electrode plate with deionized water, after sonication, is centrifuged to remove filtrate and then air-dried, and is measured by using a Malvern particle size analyzer.

Test steps are as follows. The negative electrode active layer material is dispersed in deionized water containing dispersant nonylphenol polyoxyethylene ether (with a content of 0.02-0.03 wt %) to form a mixture, which is ultrasonicated for 2 minutes and then placed into the Malvern particle size analyzer for measurement.

The median particle size of the second graphite is obtained by measuring negative electrode powder in an upper part of the electrode plate having a thickness of 10 μm or less. The median particle size of the first graphite is obtained by measuring negative electrode powder in a lower part of the electrode plate having a thickness of 20 μm or less.

2. Measurement of Content of Silicon-Based Material

After the lithium ion secondary battery is discharged to 0% SOC, the lithium ion secondary battery is disassembled, and the negative electrode plate is removed, soaked in DMC for 12 h and then rinsed with DMC to remove lithium salt adhered to the electrode plate. After air-drying, the electrode plate is subjected to high-temperature treatment at 400° C. in an inert atmosphere of a tube furnace for 2 h, the negative electrode active layer can then be peeled off from the current collector, and the negative electrode active material is collected.

In the measurement of the content of silicon, a TGA 550 thermogravimetric analyzer is used, and the amount of a sample for measurement is 5-15 mg. The temperature is increased from room temperature to 900° C. at a rate of 10° C./min in an air or oxygen atmosphere, and then maintained at 900° C. for 40 min, allowing non-silicon components of the negative electrode active material to be volatilized while the silicon is fully oxidized to silicon dioxide. The weight percentage at the end of the entire measurement process represents an ash content of the negative electrode active material, and by dividing the value of the ash content by a molar mass of silicon dioxide (60) and then multiplying by a molar mass of silicon (28), the percentage of silicon in the negative electrode active material is obtained.

3. Measurement of Content of Chromium Element on Negative Electrode Current Collector According to the measurement method in the Chinese Standard GBT 30902-2014, the measured concentration of Cr element in a standard solution, in ppm, represents the content of the chromium element on the negative electrode current collector.

4. Measurement of Depth of Groove and Spacing Between Grooves

After the lithium ion secondary battery is discharged to 0% SOC, the negative electrode plate is disassembled, and the lithium ion secondary battery is removed, soaked in a dimethyl carbonate (DMC) solvent for 12 h and then rinsed with DMC to remove lithium salt adhered to the electrode plate, and is measured by using a 3D profiler.

5. Measurement of Internal Resistance of Battery

The battery is charged to 50% SOC at a rate of 0.5 C, and is measured by using an AC internal resistance meter or a multimeter.

6. Test of Rate Performance

After being kept in a constant-temperature room at 25° C. for 2 h, the battery is discharged to 3.0 V at a constant current of 0.2 C, then left to stand for 5 min, and charged to 4.2 V at a constant current of 3 C, and further charged to 4.25 V at a constant current of 2.5 C followed by to 4.48 V at a constant current of 2 C (end at 1.2 C), the time for charging at a constant current of 3 C to 4.2 V is recorded, and a LA N D tester is set to record time at a sampling interval of 1 s.

7. Measurement of Tensile Strength of Copper Foil

After the lithium ion secondary battery is discharged to 0% SOC, the lithium ion secondary battery is disassembled, the negative electrode plate is removed, and the bare copper foil at the head of the negative electrode plate is sampled, soaked in a dimethyl carbonate (DMC) solvent for 12 h and then rinsed with DMC to remove lithium salt adhered to the electrode plate. After air-drying, the negative electrode current collector is cut into a test sample having a width of 15 mm and a length of more than 50 mm by using a cutter. A tensile test is performed on the test sample by using a WD-D3 electronic universal testing machine (having an accuracy of 0.5 grade and precision of ±1% of an indicated value), which is set to have a gauge distance of 50 mm and a speed of 50 mm/min, to measure the tensile strength of the copper foil.

8. Measurement of High-Temperature Cycling Capacity Retention Rate at 45° C.

After being left to stand for 2 h in a constant temperature room at 45° C., the battery is charged to 4.2 V at a constant current of 3 C, and further charged to 4.48 V at a constant current of 2 C and a constant voltage, ending at 0.05 C, and after being left to stand for 10 min, the battery is discharged to 3.0 V at 0.7 C, and after 2.2 T cycles in this way, the discharge capacity is C1, and the discharge capacity of the first cycle is C0, then C1/C0 is the capacity retention rate after the 500 T cycles.

The results of the above measurements are shown in Tables 1-3.

TABLE 3

|  | Internal resistance of battery (mΩ) | Tensile strength of copper foil (M Pa) | 500T cycles at 45° C. Capacity retention rate (%) | Time (min) for charging to 4.2 V at a constant current of 3C |
| --- | --- | --- | --- | --- |
| Example 1 | 30 | 590 | 90 | 2.2 |
| Example 1-1 | 31 | 605 | 88 | 1.9 |
| Example 1-2 | 32 | 610 | 85 | 1.7 |
| Example 1-3 | 32 | 620 | 80 | 1.7 |
| Example 1-4 | 29 | 570 | 88 | 2.4 |
| Example 1-5 | 27 | 550 | 90 | 3.0 |
| Example 1-6 | 27 | 500 | 90 | 3.0 |
| Example 1-7 | 29 | 492 | 88 | 2.4 |
| Example 1-8 | 30 | 570 | 88 | 2.2 |
| Example 1-9 | 31 | 540 | 88 | 1.9 |
| Example 1-10 | 29 | 595 | 88 | 2.4 |
| Example 1-11 | 31 | 590 | 80 | 1.9 |
| Example 1-12 | 29 | 500 | 90 | 2.4 |
| Example 1-13 | 31 | 590 | 80 | 1.9 |
| Example 1-14 | 30 | 590 | 90 | 2.2 |
| Example 1-15 | 30 | 590 | 90 | 2.2 |
| Example 1-16 | 30 | 590 | 88 | 2.2 |
| Example 1-17 | 34 | 590 | 87 | 1.2 |
| Example 1-18 | 28 | 490 | 87 | 2.7 |
| Example 1-19 | 32 | 590 | 85 | 1.7 |
| Example 1-20 | 33 | 570 | 85 | 1.5 |
| Example 1-21 | 30 | 610 | 85 | 2.2 |
| Example 1-22 | 30 | 620 | 85 | 2.2 |
| Example 1-23 | 33 | 570 | 70 | 1.5 |
| Example 1-24 | 30 | 600 | 84 | 2.2 |
| Example 1-25 | 30 | 600 | 84 | 2.2 |
| Example 1-26 | 29 | 500 | 90 | 2.4 |
| Example 1-27 | 33 | 600 | 80 | 1.5 |
| Comparative example 1 | 38 | 600 | 60 | 0.5 |
| Comparative example 2 | 35 | 400 | 75 | 0.9 |

As can be seen from Tables 1 to 3 that, compared with Comparative examples 1 to 2, the internal resistance of the battery in all examples does not exceed 34 min, the time required to charge to 4.2 V at a constant current of 3 C is not less than 1.2 min, the high-temperature cycling capacity retention rate at 45° C. is above 70%, and the tensile strength of the copper foil is not less than 490 M Pa, which indicates that the lithium ion secondary battery of the present application can effectively improve the tensile strength of the negative electrode current collector while improving the high-temperature cycling and rate performance. It should be noted that if the battery has a smaller internal resistance, the time for charging at a high rate is longer, that is, the battery is fully charged faster and has a better rate performance.

Compared with Example 1, the content of the 1,4-dicyano-2-butene in the electrolyte of the battery in Examples 1-3 is relatively low, which causes a poor effect of improving the stability of lattice of the positive electrode material, such that the lattice is likely to collapse during the high-temperature cycling, leading to an irreversible damage to the positive electrode, thereby resulting in a relatively poor high-temperature cycling performance. In addition, the depth of the groove in the negative electrode plate in Example 1-3 is relatively small, which causes a relatively large polarization of the negative electrode side, leading to an increase in the overall internal resistance of the battery cell and the deterioration of the rate performance. However, the contact between the electrolyte and the copper foil is also reduced, thereby reducing the corrosion of the copper foil, and ensuring the tensile strength of the copper foil. Example 1-6 is just contrast to Example 1-3, so that in Example 1-6, good rate and high-temperature cycling performances are achieved, while the tensile strength of the copper foil is significantly reduced but can meet the requirements.

It should be noted that the result of the measurement of the tensile strength of the copper foil being above 480 M Pa indicates that the negative electrode current collector has good corrosion resistance, and is less prone to breakage during the cycling of the battery.

Compared with Example 1, the content of the chromium in the negative electrode current collector in Example 1-7 is relatively low, which facilitates reducing the resistance of the current collector and thus the overall internal resistance of the battery, and optimizing the rate performance. In addition, the content of the 1,4-dicyano-2-butene in the electrolyte is relatively high, which facilitates the high-temperature cycling performance of the battery, and due to a small ratio of the content of the chromium to the content of the 1,4-dicyano-2-butene, although it is not conducive to maintaining a relatively high tensile strength of the copper foil, practical tests have shown that it can still meet the requirements. Example 1-11 is just contrast to Example 1-7, so that in Example 1-11, poor rate and high-temperature cycling performances are caused, but the tensile strength of the copper foil is relatively high.

Compared with Example 1, the spacing L between the grooves in the negative electrode plate in Example 1-17 is relatively large, and the width S of the negative electrode tab groove is small, such that the ratio of the width S of the negative electrode tab groove to L is too small, and the grooves are sparse, which causes a poor effect of improving the polarization on the negative electrode side and a reduced conductivity on the negative electrode side, leading to an increase in the internal resistance of the battery and thus affecting the rate performance. Example 1-18 is just contrast to Example 1-17, so that in Example 1-18, the internal resistance of the battery is small, and the rate performance is better, but the tensile strength of the copper foil is reduced due to the dense grooves.

Compared with Example 1, the amount of the silicon doped in the negative electrode plate in Example 1-22 is small, which facilitates reducing the internal resistance of the battery and optimizing the rate performance. In addition, due to fewer side reactions, the high-temperature capacity retention rate is high, and the content of the 1,4-dicyano-2-butene in the electrolyte is low, which facilitates ensuring the tensile strength of the copper foil. However, in Example 1-23, the amount of the silicon doped in the negative electrode plate is higher, and due to the high strength and high expansion of the silicon-based material, the copper foil will be damaged, which results in a reduced tensile strength of the copper foil and is also not conducive to high-temperature cycling performance.

Compared with Example 1, the particle size of the graphite in the negative electrode plate in Example 1-26 is smaller, achieving a good conductivity, so that the battery has a smaller internal resistance and a better rate performance. In addition, the content of the 1,4-dicyano-2-butene in the electrolyte is high, achieving a good high-temperature cycling performance but low tensile strength of the copper foil. However, in Example 1-27, the particle size of the graphite in the negative electrode plate is larger, which affects the conductivity, so that the internal resistance of the battery is larger, and the rate performance is affected. In addition, the content of the 1,4-dicyano-2-butene in the electrolyte is low, which is conducive to ensuring the tensile strength of the copper foil but not conducive to the high-temperature cycling performance.

Compared with Example 1, the content of the 1,4-di-cyano-2-butene in the electrolyte of the battery in Comparative Example 1 is too low, causing an excessively small value of E*H. Although the tensile strength of the copper foil is ensured, the high-temperature cycling performance of the battery is seriously affected. In addition, due to a smaller depth of the groove in the negative electrode plate, the effect of infiltration of the electrolyte is poor, which deteriorates the rate performance. However, in Comparative example 2, the content of the 1,4-dicyano-2-butene in the electrolyte is too high, causing an excessively large value of E*H and serious corrosion of the copper foil, which makes the tensile strength of the copper foil too low to meet the requirements and is also not conducive to the performance of the battery, resulting in poor rate and high-temperature cycling performances of the battery.

Obviously, the above examples are merely examples given for clarity of illustration and are not intended to limit the embodiments. For those of ordinary skill in the art, other different forms of changes or variations could have also been made on the basis of the above-mentioned illustrations. There is no need to exhaustively list all embodiments herein, although it cannot be achieved. The obvious changes or variations thus derived are still within the scope of protection of the present application.

What is claimed is:

1. A lithium ion secondary battery, comprising a negative electrode plate, a positive electrode plate, a separator, and an electrolyte; wherein the negative electrode plate comprises a negative electrode current collector and a negative electrode active layer disposed on at least one side surface of the negative electrode current collector;

the negative electrode current collector comprises a chromium element, and with a mass of the negative electrode current collector as a reference, a content of the chromium element is C ppm, wherein $10 \leq C \leq 300$;

a groove is provided in a surface of the negative electrode active layer away from the negative electrode current collector, and has a depth of H μm;

the electrolyte includes 1,4-dicyano-2-butene, and with a mass of the electrolyte as a reference, a content of the 1,4-dicyano-2-butene is E, wherein $0.01\% \leq E \leq 5\%$; and the following is satisfied: $0.0005 \leq E*H \leq 1.75$.

2. The lithium ion secondary battery according to claim 1, wherein the following is satisfied: $0.005 \leq E*H \leq 1.5$; and/or $5 \leq H \leq 35$.

3. The lithium ion secondary battery according to claim 2, wherein the following is satisfied: $200 \leq C/E \leq 3 \times 10^6$.

4. The lithium ion secondary battery according to claim 3, wherein at least one of the following conditions is satisfied:
   a, $10 \leq C \leq 100$;
   b, $0.1\% \leq E \leq 4.3\%$; and
   c, $233 \leq C/E \leq 10^5$.

5. The lithium ion secondary battery according to claim 4, wherein a recessed area which has an opening facing the separator is provided in the negative electrode plate, the recessed area comprising a tab groove and a tab tape groove; wherein in a thickness direction of the negative electrode plate, the tab tape groove is higher than the tab groove to form a stepped surface, and a tab tape is arranged on the stepped surface and covers the tab groove;

in the thickness direction of the negative electrode plate, a thickness $T_3$ of the negative electrode active layer is greater than or equal to a depth $T_1$ of the tab tape groove, and the depth $T_1$ of the tab tape groove is greater than or equal to a thickness $T_2$ of the tab tape;

and/or in a length direction of the negative electrode plate, a width $W_1$ of the tab tape groove is greater than or equal to a width $W_2$ of the tab tape, and the width $W_2$ of the tab tape is greater than or equal to a width S of the tab groove.

6. The lithium ion secondary battery according to claim 5, wherein a length direction of the groove is parallel to the width direction of the negative electrode plate, at least two grooves are provided, and a spacing between adjacent two of the grooves is L, wherein $0.5 \text{ mm} \leq L \leq 2 \text{ mm}$; and the width S of the tab groove satisfies: $6 \text{ mm} \leq S \leq 15 \text{ mm}$, and $3 \leq S/L \leq 30$.

7. The lithium ion secondary battery according to claim 2, wherein a recessed area which has an opening facing the separator is provided in the negative electrode plate, the recessed area comprising a tab groove and a tab tape groove; wherein in a thickness direction of the negative electrode plate, the tab tape groove is higher than the tab groove to form a stepped surface, and a tab tape is arranged on the stepped surface and covers the tab groove;

in the thickness direction of the negative electrode plate, a thickness $T_3$ of the negative electrode active layer is greater than or equal to a depth $T_1$ of the tab tape groove, and the depth $T_1$ of the tab tape groove is greater than or equal to a thickness $T_2$ of the tab tape;

and/or in a length direction of the negative electrode plate, a width $W_1$ of the tab tape groove is greater than or equal to a width $W_2$ of the tab tape, and the width $W_2$ of the tab tape is greater than or equal to a width S of the tab groove.

8. The lithium ion secondary battery according to claim 7, wherein a length direction of the groove is parallel to the width direction of the negative electrode plate, at least two grooves are provided, and a spacing between adjacent two of the grooves is L, wherein $0.5 \text{ mm} \leq L \leq 2 \text{ mm}$; and the width S of the tab groove satisfies: $6 \text{ mm} \leq S \leq 15 \text{ mm}$, and $3 \leq S/L \leq 30$.

9. The lithium ion secondary battery according to claim 1, wherein the following is satisfied: $200 \leq C/E \leq 3 \times 10^6$.

10. The lithium ion secondary battery according to claim 3, wherein at least one of the following conditions is satisfied:
    a, $10 \leq C \leq 100$;
    b, $0.1\% \leq E \leq 4.3\%$; and
    c, $233 \leq C/E \leq 10^5$.

11. The lithium ion secondary battery according to claim 10, wherein a recessed area which has an opening facing the separator is provided in the negative electrode plate, the recessed area comprising a tab groove and a tab tape groove; wherein in a thickness direction of the negative electrode plate, the tab tape groove is higher than the tab groove to form a stepped surface, and a tab tape is arranged on the stepped surface and covers the tab groove;

in the thickness direction of the negative electrode plate, a thickness $T_3$ of the negative electrode active layer is greater than or equal to a depth $T_1$ of the tab tape groove, and the depth $T_1$ of the tab tape groove is greater than or equal to a thickness $T_2$ of the tab tape;

and/or in a length direction of the negative electrode plate, a width $W_1$ of the tab tape groove is greater than or equal to a width $W_2$ of the tab tape, and the width $W_2$ of the tab tape is greater than or equal to a width S of the tab groove.

12. The lithium ion secondary battery according to claim 11, wherein a length direction of the groove is parallel to the width direction of the negative electrode plate, at least two grooves are provided, and a spacing between adjacent two of the grooves is L, wherein 0.5 mm≤L≤2 mm; and the width S of the tab groove satisfies: 6 mm≤S≤15 mm, and 3≤S/L≤30.

13. The lithium ion secondary battery according to claim 1, wherein a recessed area which has an opening facing the separator is provided in the negative electrode plate, the recessed area comprising a tab groove and a tab tape groove; wherein in a thickness direction of the negative electrode plate, the tab tape groove is higher than the tab groove to form a stepped surface, and a tab tape is arranged on the stepped surface and covers the tab groove;

in the thickness direction of the negative electrode plate, a thickness $T_3$ of the negative electrode active layer is greater than or equal to a depth $T_1$ of the tab tape groove, and the depth $T_1$ of the tab tape groove is greater than or equal to a thickness $T_2$ of the tab tape;

and/or in a length direction of the negative electrode plate, a width $W_1$ of the tab tape groove is greater than or equal to a width $W_2$ of the tab tape, and the width $W_2$ of the tab tape is greater than or equal to a width S of the tab groove.

14. The lithium ion secondary battery according to claim 13, wherein a length direction of the groove is parallel to the width direction of the negative electrode plate, at least two grooves are provided, and a spacing between adjacent two of the grooves is L, wherein 0.5 mm≤L≤2 mm; and the width S of the tab groove satisfies: 6 mm≤S≤15 mm, and 3≤S/L≤30.

15. The lithium ion secondary battery according to claim 13, wherein a distance between a junction between the tab groove and the negative electrode active layer and the groove is $G_1$, wherein 0≤$G_1$≤5 mm;

and/or a distance between an end of the groove and an edge of the negative electrode active layer is $G_2$, wherein 0≤$G_2$≤5 mm.

16. The lithium ion secondary battery according to claim 1, wherein the negative electrode active layer comprises a first active layer and a second active layer arranged in a stack, wherein the first active layer is located between the negative electrode current collector and the second active layer, and a ratio of a thickness of the second active layer to a total thickness of the negative electrode active layer is x, wherein 0.1≤x≤0.5;

the first active layer comprises a first negative electrode active material, the first negative electrode active material comprising a first graphite having a median particle size $Dv50_1$ in a range of 12 μm-20 μm;

the second active layer comprises a second negative electrode active material, the second negative electrode active material comprising a second graphite having a median particle size $Dv50_2$ in a range of 5 μm-12 μm; and the following is satisfied: $Dv50_1 > Dv50_2$.

17. The lithium ion secondary battery according to claim 16, wherein the first negative electrode active material and/or the second negative electrode active material further comprises a silicon-based material, and with a mass of the first negative electrode active material or the second negative electrode active material as a reference, a content of the silicon-based material is D, and the following is satisfied: 0.2≤D/E≤3000, and 0.010%≤E≤5%.

18. The lithium ion secondary battery according to claim 17, wherein D is in a range of 1%-30%.

19. The lithium ion secondary battery according to claim 18, wherein D is in a range of 3%-30%, E is in a range of 0.1%-4.3%, and 0.7≤D/E≤300.

20. The lithium ion secondary battery according to claim 1, wherein the lithium ion secondary battery has a charge cutoff voltage greater than or equal to 4.48 V.

* * * * *